United States Patent
Fornof

(10) Patent No.: US 6,319,296 B1
(45) Date of Patent: Nov. 20, 2001

(54) AIR SYSTEM BYPASS FOR OIL SEPARATOR

(75) Inventor: William P. Fornof, Girard, PA (US)

(73) Assignee: AlliedSignal Truck Brake Systems Company, Elyria, OH (US)

( * ) Notice: Subject to any disclaimer, the term of this patent is extended or adjusted under 35 U.S.C. 154(b) by 0 days.

(21) Appl. No.: 09/374,343

(22) Filed: Aug. 13, 1999

(51) Int. Cl.$^7$ .................................................. B01D 46/42
(52) U.S. Cl. ................................. 55/313; 55/314; 96/400
(58) Field of Search ........................... 55/310–314; 95/19, 95/39, 41, 117–119, 121, 122, 141, 273, 287; 96/113, 134–136, 143, 399, 400

(56) References Cited

U.S. PATENT DOCUMENTS

| | | | |
|---|---|---|---|
| 2,170,074 | * | 8/1939 | Hewitt ................................ 55/313 X |
| 2,823,760 | * | 2/1958 | Andersen ................................ 55/313 |
| 3,339,349 | * | 9/1967 | Farnum ................................ 55/313 X |
| 3,397,516 | * | 8/1968 | Kobnick ................................ 55/313 |
| 3,527,027 | | 9/1970 | Knight et al. ........................... 96/134 |
| 3,646,734 | * | 3/1972 | Cannella ............................. 55/314 X |
| 3,819,052 | | 6/1974 | Firth ........................................ 210/90 |
| 3,832,831 | * | 9/1974 | Ritchie et al. ..................... 96/136 X |
| 3,876,400 | * | 4/1975 | Frantz ................................ 55/314 X |
| 3,890,122 | * | 6/1975 | Frantz ................................ 55/314 X |
| 4,478,617 | * | 10/1984 | Rees ........................................ 55/314 |
| 4,529,514 | * | 7/1985 | Gruett ................................ 55/314 X |
| 4,655,801 | | 4/1987 | Kojima et al. .................. 55/DIG. 17 |
| 5,046,921 | | 9/1991 | Tamamori ......................... 415/121.2 |
| 5,286,283 | * | 2/1994 | Goodell ............................. 96/135 X |
| 5,334,230 | * | 8/1994 | Sloka ..................................... 96/113 |
| 5,403,387 | * | 4/1995 | Flynn et al. ........................... 96/143 |
| 5,404,972 | | 4/1995 | Popjoy et al. ....................... 118/277 |

FOREIGN PATENT DOCUMENTS

| | | | |
|---|---|---|---|
| 0372606 | * | 3/1923 | (DE) ..................................... 55/313 |
| 2761898 | | 10/1998 | (FR) . |
| 2090015 | | 10/1982 | (GB) . |

* cited by examiner

Primary Examiner—Robert H. Spitzer

(57) ABSTRACT

An oil separator such as used in an air charging system includes a bypass assembly. During normal operation, airflow from an inlet to an outlet passes through the filter to remove oil and oil vapor from the compressed air. If a restriction or blockage occurs in the filter, as exhibited by a predetermined pressure differential across the filter, a bypass passage is opened to allow direct communication between the inlet and outlet ports. A spring defines the pressure responsive member that allows the filter to move away from the valve seat and establish communication between the inlet and outlet ports of the housing.

14 Claims, 3 Drawing Sheets

AIR SYSTEM BYPASS FOR OIL SEPARATOR

BACKGROUND OF THE INVENTION

1. Field of the Invention

This invention relates to a compressed air system, such as an air charging system used in trucks or heavy vehicles.

2. Discussion of the Art

Trucks and heavy vehicles use pressurized air systems for braking, suspension, and auxiliary uses. For example, a compressor is driven by the vehicle engine and a governor associated with the compressor selectively loads and unloads the compressor as required for system operation.

Preferably, before the air is conveyed downstream for use or storage in a reservoir, the air is cleaned since a residual amount of oil, oil vapor, water, and water vapor flows through the compressor discharge line. An oil separator and an air dryer are commonly used to clean the air flow. The oil separator preferably removes water in liquid form, as well as oil in vapor and aerosol form, and solid contaminants. The air then exits the oil separator and passes through a desiccant or drying material. The desiccant adsorbs the water vapor to the desiccant material where the moisture is periodically purged from the air dryer. This arrangement removes approximately 95% of the water vapor in the pressurized air.

It is also contemplated that an oil separator can be positioned at other locations downstream of the compressor. Accordingly, this improvement is not limited to those systems where the oil separator is disposed adjacent the compressor or air dryer, but is more generally applicable for use in a compressed air system where needed.

If an undue restriction occurs in the oil filter element, it is still necessary to convey the compressed air downstream. That is, air is still required for downstream uses such as braking, suspension, so that a need exists for automatically bypassing the oil separator under certain conditions.

SUMMARY OF THE INVENTION

The present invention contemplates a new and improved bypass assembly for an oil separator in an air charging system that overcomes the noted problems and provides a simple, economical assembly and process for achieving these goals.

According to the present invention, a housing has an inlet for receiving supply air and an outlet for delivering air. An oil removal member or filter is interposed between the inlet and outlet to remove oil from the air. A passage selectively bypasses the oil removal member and communicates between the housing inlet and outlet in response to a predetermined pressure differential.

According to another aspect of the invention, a seal member is interposed between the oil removal member and the housing for sealing these components together below the predetermined pressure differential.

According to yet another aspect of the invention, a biasing member urges the oil removal member against the housing below the predetermined pressure differential and is spaced from the housing seal member when the predetermined pressure differential is attained.

A principal advantage of the invention is realized in the ability to provide effective pressurized air for downstream uses such as braking even if a restriction exists in the oil removal member.

Another advantage of the invention is found in the simple, economical structure that achieves this objective.

Still another advantage of the invention is found in the automated operation of the bypass.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings.

DETAILED DESCRIPTION OF THE PREFERRED EMBODIMENT

Figure 1:
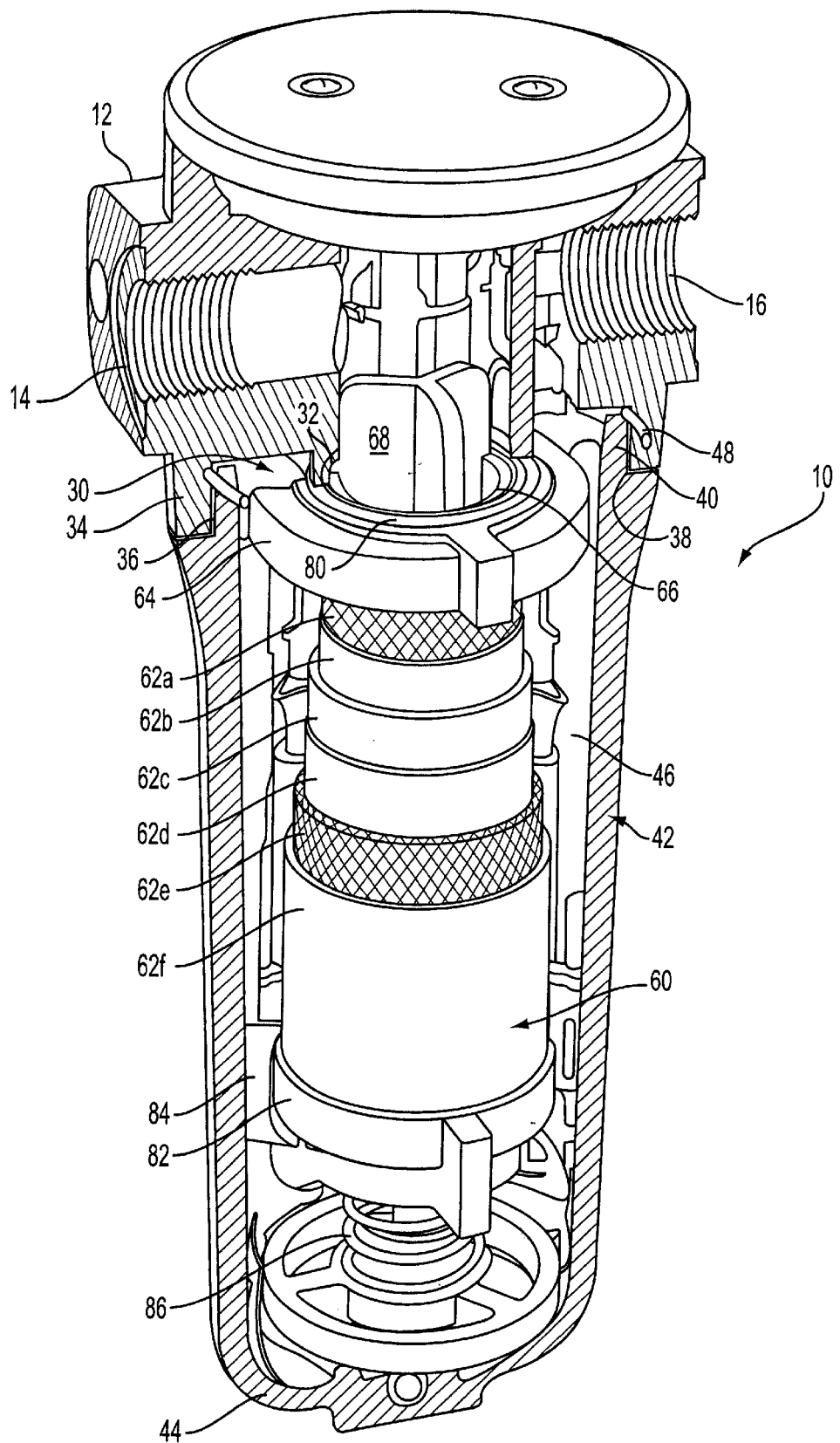
FIG. 1 is a perspective view of an oil separator used in an air charging system, with selected components cut away for ease of illustration.
Figure 2:
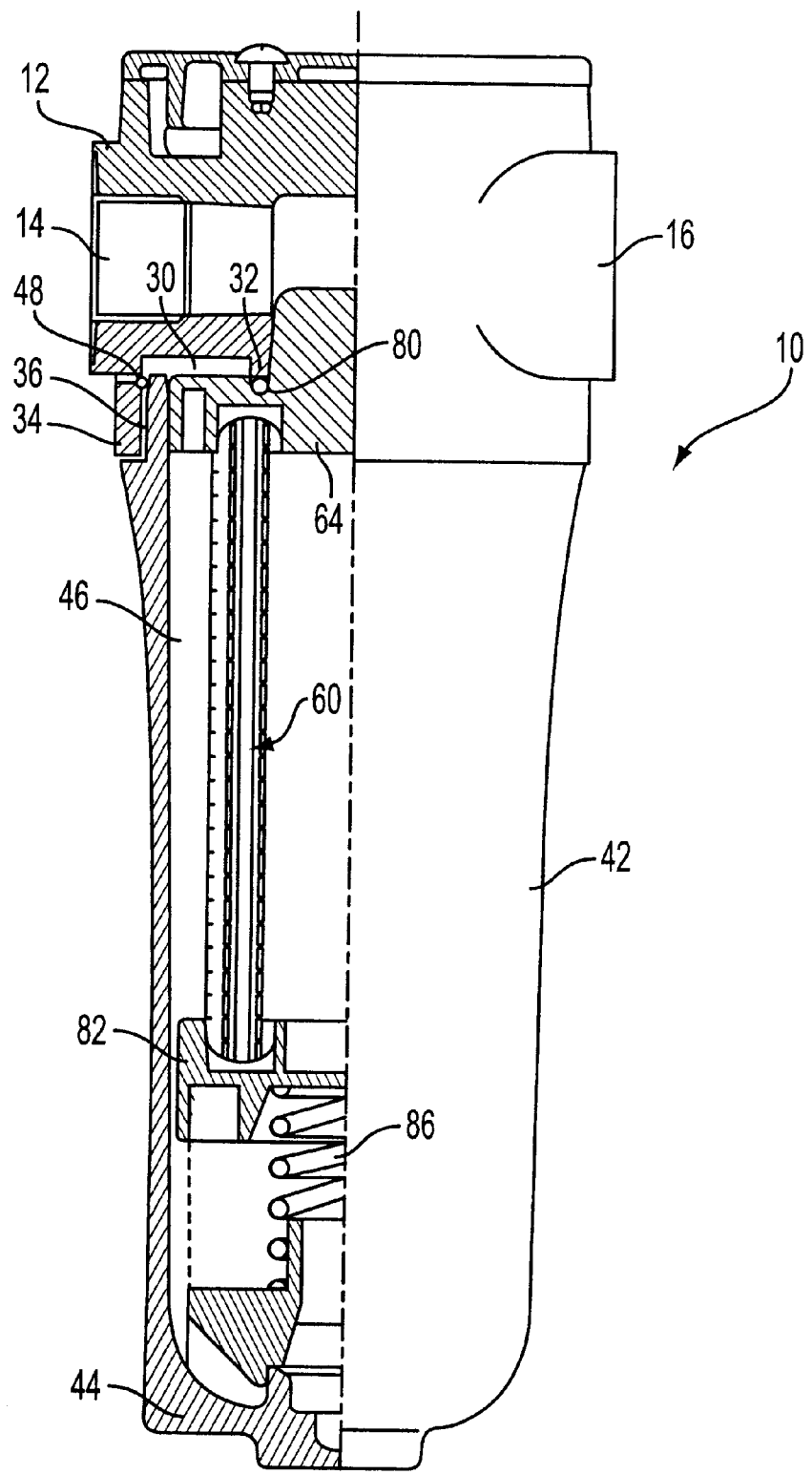
FIG. 2 is an elevational view, partly in cross section, of the oil separator in a normal operating position.
Figure 3:
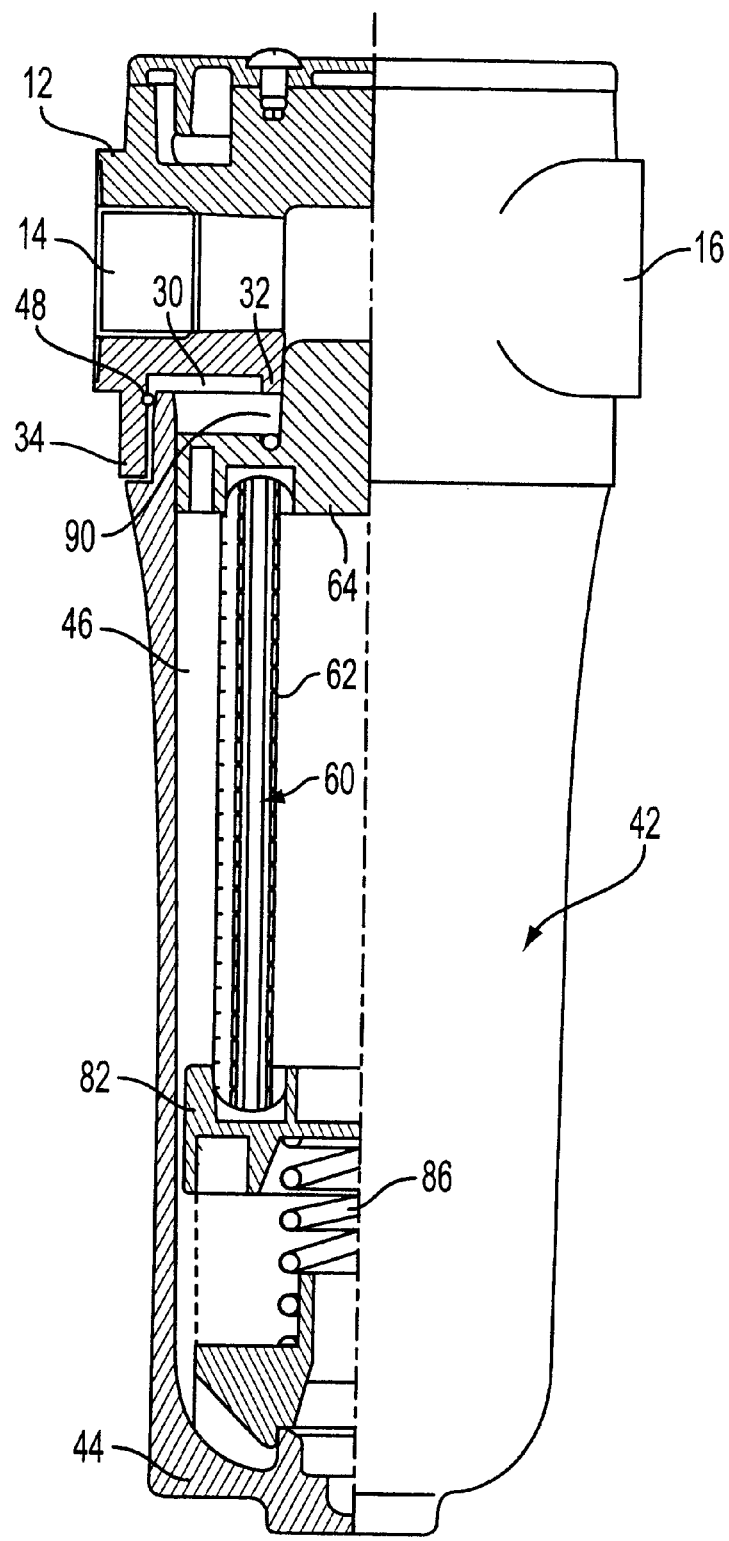
FIG. 3 is an elevational view also partly in cross section showing the components in a bypass position.

A bypass assembly 10 for an oil separator in a truck brake system is shown in FIGS. 1–3. More particularly, the assembly comprises a head 12 having an upstream or inlet port 14 and a second or downstream port 16 communicating with a compressed air braking system (not shown). As will be appreciated, the inlet port 14 typically communicates with the compressor, reservoir, or other source of compressed air. On the other hand, the downstream port 16 can be disposed upstream of an air dryer, reservoir, air suspension assembly, wheel brake chamber, etc.

An annular recess 30 is defined by circumferentially continuous, radially spaced shoulders 32, 34 extending from the head. Preferably, the outer shoulder 34 includes internal threads 36 that the external threads 38 of a locating shoulder 40 disposed on housing 42. The housing has a first or open end that is received in the head 12. A second end 44 is closed. The housing defines a cavity 46 that is hermetically sealed from the environment by a seal member or O-ring 48 disposed between the shoulders 34, 40 of the head and housing, respectively.

Received within the housing cavity is an oil separator member or filter 60, which is a multilayer assembly as represented and illustrated by layers 62a–f. The multiple layers are intended to remove water, oil, or oil vapor from the air received through inlet port 14. The particular structural arrangement and details of these various layers are well-known to those skilled in the art and do not form a particular part of the subject invention so that further explanation is unnecessary. A first or upper annular end cap 64 includes a central opening 66 that communicates with the inlet port 14. A spacer member 68 provides an internal support to the filter 60 and allows for the free flow of air from the inlet port axially along the interior of the hollow, generally cylindrical filter where the air egresses radially through the filter layers into the cavity 46 with the contaminants removed therefrom. The end cap 64 is dimensioned to define an annular space with the interior wall of the housing 42 so that open communication is established with the outlet port 16, delivering compressed air devoid of any oil to a downstream use (not shown). In addition, a seal member such as O-ring 80 surrounds the opening in the end cap 64 and is located for abutting, sealing engagement with the shoulder 32 of the head. In other words, shoulder 32 defines a valve seat that is selectively engaged by the O-ring 80.

When disposed in engaging relation, air flow through the assembly is as described above.

The second or lower end cap 82 receives the opposite end of the filter 60. Radial arms 84 are circumferentially spaced about the end cap and provide for centering, spaced relation of the end cap relative to the housing. A biasing member such as coil spring 86 is axially interposed between the lower end 44 of the housing and the end cap 82 to urge the filter 60 upward, or into sealing engagement with the valve seat 32. As will be appreciated, if a restriction or blockage occurs in the filter member 60, or a predetermined pressure differential between the interior of the filter and the housing cavity 46 is encountered, air pressure will build in the inlet port 14 and urge the entire filter assembly downwardly to compress the spring 86. This unseats the O-ring 80 from the valve seat 32 and establishes a bypass passage 90 (FIG. 3) allowing the inlet port to communicate directly with the outlet port via housing cavity 46. In this manner, the inlet and outlet ports are in communication without proceeding through the oil filter 60. The arms 84 also extend axially to prevent the oil filter cartridge from being completely removed from the head 12 under high pressure. In the preferred embodiment, the spring exerts a force of approximately twenty five (25) pounds. It will be appreciated, however, that this force is exemplary only.

In operation, if a restriction or blockage is developed in the oil filter, the predetermined pressure threshhold is reached. This produces a build-up of pressure in the inlet port that compresses the spring 86. The entire filter assembly, including the end caps is then urged downwardly to establish the communication through the bypass passage 90 with the outlet port 16. Once the filter is replaced by threadably removing the housing 42 and gaining access to the cartridge for replacement, the spring urges the replacement filter into engagement with the seat 32 so that the compressed air is cleaned and filtered as desired.

The invention is described with reference to the preferred embodiment. Modifications and alterations will occur to others upon a reading and understanding of the present invention. It is intended to include all such modifications and alterations in so far as they come within the scope of the appended claims or the equivalents thereof.

Having thus described the invention, it is now claimed:

1. A bypass assembly for an oil separator in an air charging system comprising:
   a cylindrical housing having an inlet for receiving supply air and an outlet for delivering air, both said inlet and said outlet being located proximate to one end of the cylindrical housing;
   an annular oil removal member interposed between the housing inlet and outlet for removing oil, particulate and liquid water from air; said annular oil removal member dimensioned for receipt in the housing so as to provide an annular space between the oil removal member and the housing, and for receiving airflow axially therethrough;
   a biasing member urging the oil removal member against the housing at the end that is proximate to said inlet and outlet below a predetermined pressure differential between said inlet and said outlet; and
   a passage between said inlet and said outlet that does not pass through said annular space for selectively bypassing the oil removal member and communicating between the housing inlet and outlet in response to movement of said oil removal member away from the housing at the end that is proximate to said inlet and outlet in response to a pressure differential between the inlet and outlet that exceeds said predetermined pressure differential.

2. The bypass assembly of claim 1 further comprising a seal member interposed between the oil removal member and the housing for selectively sealing the oil removal member to the housing and directing air at a level below the predetermined pressure differential through the oil removal member.

3. The bypass assembly of claim 1 wherein the oil removal member receives airflow axially therethrough and proceeding radially outward therefrom.

4. The bypass assembly of claim 1 wherein the housing is threaded on a head disposed in an air line of the air charging system for ease of assembly and disassembly of the housing from the head to change the oil removal member.

5. The bypass assembly of claim 4 wherein said biasing member comprises a spring received in a closed end of the housing and urging the oil removal member toward an open end of the housing and into sealing engagement with the head.

6. The bypass assembly of claim 5 wherein the head includes a central inlet port for communicating with the oil removal member and the housing and an outlet passage disposed radially outward therefrom for receiving air after passing through the oil removal member.

7. The bypass assembly of claim 6 wherein the head includes a seat selectively engaged by the oil removal member to close the bypass passage below a predetermined pressure differential.

8. A bypass assembly in an air charging system having an oil separator filter located downstream of a compressor, the bypass assembly comprising:
   a cylindrical housing having, located at one end of the cylinder, an inlet for receiving air from the compressor and an outlet for delivering air to a downstream use;
   an annular replaceable filter member for removing oil from the air dimensioned for receipt in the housing so as to provide an annular space between the filter member and the housing, and for receiving airflow axially therethrough;
   a biasing member urging the filter member against the housing at the end that is proximate to said inlet and outlet below a predetermined pressure differential between said inlet and said outlet; and
   a passage between said inlet and said outlet that does not pass through said annular space for selectively bypassing the filter member in response to movement of said filter member away from the housing at the end that is proximate to said inlet and outlet in response to a pressure differential between the inlet and outlet that exceeds said predetermined pressure differential so that compressed air is delivered to the downstream use if flow through the filter member becomes unduly restricted.

9. The bypass assembly of claim 8 further comprising a seal member interposed between the oil removal member and the housing for selectively sealing the oil removal member to the housing and directing air at a level below the predetermined pressure differential through the oil removal member.

10. The bypass assembly of claim 9 wherein the filter member receives airflow axially therethrough and proceeding radially outward therefrom.

11. The bypass assembly of claim 8 wherein the housing is threaded on a head disposed in an air line of the air charging system for ease of assembly and disassembly of the housing from the head to change the oil removal member.

12. The bypass assembly of claim 11 wherein said biasing member comprises a spring received in a closed end of the housing and urging the oil removal member toward an open end of the housing and into sealing engagement with the head.

13. The bypass assembly of claim 12 wherein the head includes a central inlet port for communicating with the oil removal member and the housing and an outlet passage disposed radially outward therefrom for receiving air after passing through the oil removal member.

14. The bypass assembly of claim 13 wherein the head includes a seat selectively engaged by the oil removal member to close the bypass passage below a predetermined pressure differential.

* * * * *